May 30, 1939.  R. W. GOEB  2,160,499
FISHING POLE HOLDER
Filed Jan. 27, 1937
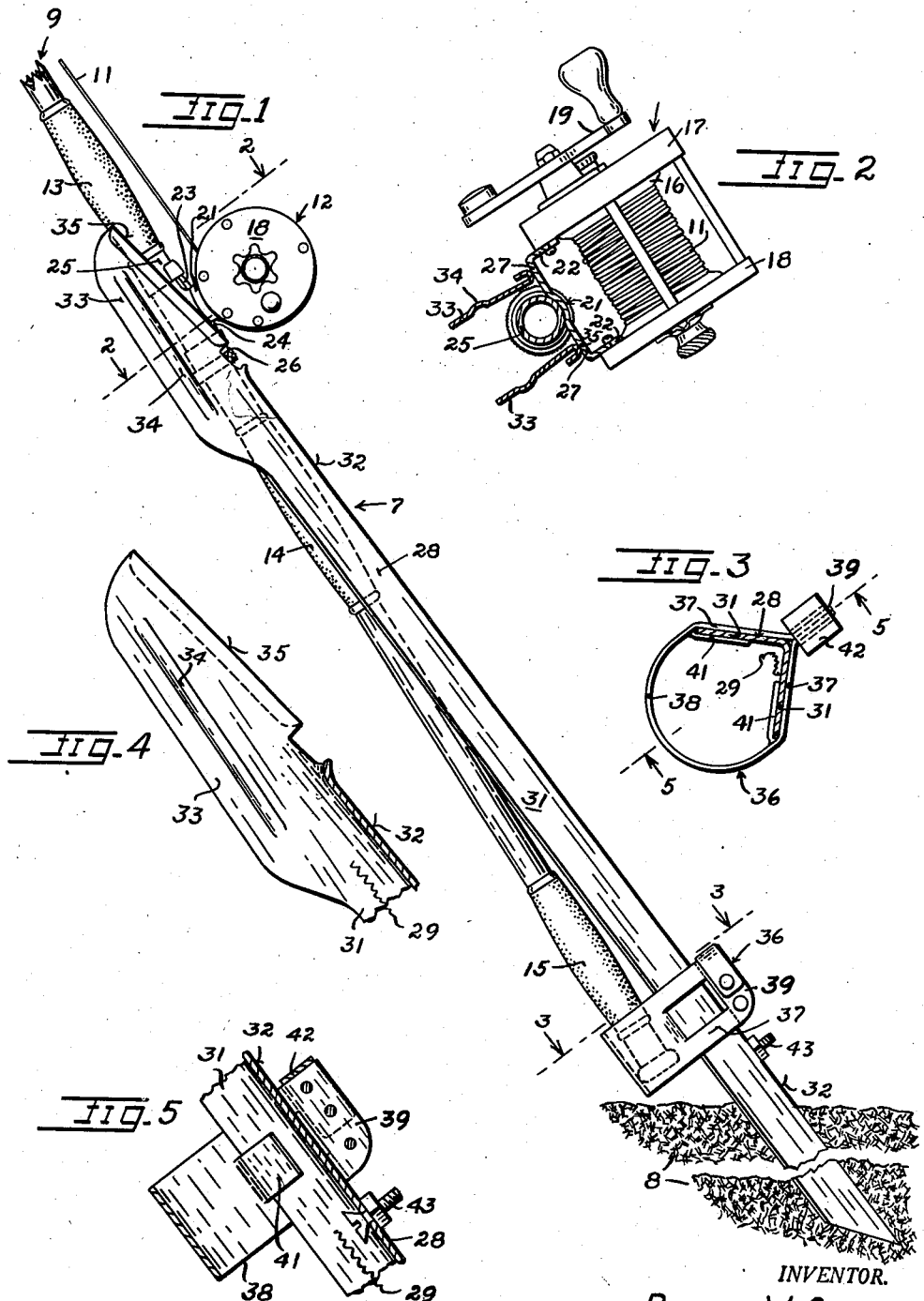
INVENTOR.
RUDOLPH W. GOEB
BY Henry N. Young
ATTORNEY.

Patented May 30, 1939

2,160,499

UNITED STATES PATENT OFFICE 2,160,499

FISHING POLE HOLDER

Rudolph W. Goeb, Oakland, Calif.

Application January 27, 1937, Serial No. 122,556

2 Claims. (Cl. 248—44)

The invention relates to a device for mechanically holding a fishing pole or rod which is in use in surf or bank fishing, and is provided with a usual reel for the fish line.

An object of the invention is to provide a holder which affords a firm mounting of a fishing pole in uptilted position and for its unhindered removal by the fisherman to permit its appropriate manipulation for pulling in a caught fish or rebaiting a hook or recasting the line.

Another object is to provide a holder which will support the fishing pole against the axial rotation of the pole in its mounting, and with the reel disposed at the upper pole side.

A further object is to provide the holder with means for facilitating the operative installation thereof in sand or earth.

The invention possesses other objects and features of advantage, some of which, with the foregoing, will be set forth or be apparent in the following description of a typical embodiment thereof, and in the accompanying drawing, in which, Figure 1 is a side elevation of the operatively disposed holder having a fishing pole mounted therein, the pole being shown fragmentarily.

Figure 2 is an enlarged section at the broken line 2—2 in Figure 1.

Figure 3 is an enlarged sectional view of the holder at the line 3—3 in Figure 1.

Figure 4 is an enlarged fragmentary longitudinal section through an upper portion of the holder.

Figure 5 is an enlarged fragmentary section at the line 5—5 in Figure 3.

As particularly illustrated, a holder structure 7 is shown as engaged in sand or earth 8 for supporting a fishing pole 9 in an obliquely upstanding position whereby the fishline 11 extending from a reel 12 mounted at the handle portion of the fishing pole may be elevated at the pole tip. The present pole 9 is provided with a forward hand grip 13, an intermediate grip 14 and a rearward or inner grip 15, the latter grip being located immediately adjacent the butt end of the pole.

The reel 12 is of a usual structure and comprises a line-receiving spool 16 rotatably mounted between fixedly related end plates 17 and 18. The reel assembly is provided with the usual crank handle 19 and other devices for controlling the winding and unwinding of the fishline 11 with respect to the spool 16.

The reel assembly is carried on a usual mounting bracket or base 21 which comprises a plate having upturned side ears thereof connected to the end plates 17 and 18 to fix the assembly on the base. Opposite extensions 23 and 24 of the base 21 are provided for use in securing the base to a cylindrical portion 25 of the pole between the grips 13 and 14. As indicated, the extension 23 is disposable in a socket provided at one end of the pole portion 25, while the extension 24 is engageable within a ring 26 which is slidably mounted on the pole portion 25 for effecting a releasable mounting of the reel on the pole. It will be understood that the plate blank which provides the various base portions would be generally cross-shaped.

As is usual, the length of the reel spool 16 considerably exceeds the diameter of the adjacent pole portion whereby the base plate extends well beyond the pole at the ears 22 to provide oppositely extending base portions which are more or less coplanar and have the ears 22 extending transversely from them at their outer ends. The under faces of the extensions 23 and 24 and the connecting plate portion may be formed to provide a channel for fittedly receiving the opposed pole portion 25, as disclosed in Figure 2.

Referring now to the structure of the holder 7, the latter is seen to comprise a stake member 28 formed of sheet metal or the like to define a trough or channel 29 along one side thereof. The present stake member comprises a pair of flanges 31 which are of like width and are integrally joined in mutually perpendicular relation to define an exterior V edge 32 of the stake and the channel 29 between them. At its lower end the stake 28 is sharpened by obliquely cutting off the flanges 31 from the lower extremity of the edge 32; this is designed to facilitate a pushing or driving of the stake into the ground at its point of use.

At its upper end, the stake member 28 is bifurcated to define a slot extending from the upper stake extremity in the general line of the edge 32. Longitudinal extensions 32 of the flanges 31 provide flat and mutually parallel sides for the fork thus defined at the upper stake end. As illustrated, the fork sides 33 are somewhat broader than the flanges 31 and are provided with integral and offset embossments 34 extending longitudinally of the stake member for stiffening the fork sides transversely thereof.

The edges 35 of the fork sides 33 nearest to the line of the stake edge 32 are mutually coplanar, with their plane intersecting said line adjacent the bottom of the fork notch. As illustrated, the material of the fork sides at the edges 35 is bent back upon itself to define a cylindrically rounded bead at said edges, this arrangement further stiffening the fork sides transversely thereof while insuring a smooth surface along said edges.

A member 36 is slidably mounted on the stake member 28 below the described fork for adjusted disposal along the stake. This member is shown as comprising a strap of metal having portions 37 thereof engaged flat against the outer faces of the flanges 31 and connected by an arcuate loop 38. End portions 39 of the strap are fixed flat against each other in a plane which includes the line of the edge 32 and bisects the angle of the stake sides 31. Tongues 41 are struck out of the portions 37 to extend opposite and bear flat against the inner faces of the flanges 31 whereby the flanges are frictionally gripped between the tongues 41 and the remainder of the portions 37 to secure the member 36 in fixed angular relation to the stake as it is adjustably moved therealong. For a reason which will hereinafter be brought out, the space jointly defined by the loop 38 and the opposed trough portion is large enough to freely receive the butt portion of the rod.

A step plate 42 is mounted on and above the strap ends 39 to provide a bearing face which is transverse to the stake axis, and a stop bolt 43, or other stop element, is fixed in the stake 28 at a point thereof below the member 36. When the member 36 is engaged with the bolt 43, the application of a person's foot, or some striking implement, against the step plate may be utilized to drive the stake into the ground for its fixed positioning therein as a support for a fishing pole.

As is particularly illustrated, the stake member 28 is engaged in the ground in an obliquely upright position wherein the edge 32 is at the upper side of the stake, and the trough or channel 29 opens downwardly. The upper fork edges 35 slope downwardly away from the line of the stake edge 32 whereby the plane of said edges is oblique to the stake axis. The relation of the holder parts is such that if the pole is inserted downwardly through the slot of the stake fork to dispose its butt end within the loop 38, the under faces of the different reel base portions 27 will be wedgedly engaged with the different fork edges 35, the pole handle portion below the reel will engage the sides of the trough, and the pole will come to rest in a set position with the reel at the upper side of the pole.

By reason of the provision of the elongated bearing edges 35 of the fork and the adjustability of the member 36 for its positioning to receive the butt end of the pole, it will be understood that the present holder will supportingly engage variously designed and proportioned fishing-pole structures, provided only that the reel is appreciably spaced from the butt end of the pole. In this manner, the present holder is adapted for substantially universal use by fishermen who wish to use a set pole, a holder for this purpose being generally called a "spike" by such fishermen. The lower stake end might, of course, be engaged in a complementary socket or loop mounted on a boat or wharf for fixing it in pole-holding position.

It will be understood that the present holder so engages a pole having a reel thereon as to prevent a rotation of the pole while it is mounted in the holder. With a pole mounted as shown, the reel is disposed above the pole and in the same relation with respect thereto as a fisherman may desire it when he removes the pole for its manipulation. It will be understood that the pole is mounted for instantaneous release and removal merely by lifting it slightly in the holder to dispose the reel beyond the upper stake end and then moving it laterally from beneath the stake.

For fishermen who prefer to fish with the reel beneath the pole, the stake 28 may be engaged in the ground with its edge 32 downwardly. A pole mounted on a stake so positioned in the ground would be as firmly held as before, it being noted that the engagement of the reel base with the oblique fork edges again limits the degree of insertion of the bottom pole portion in the holder and prevents a rotation of the mounted pole about its axis. Also, the present holder is equally usable by right-handed and left-handed persons.

From the foregoing description taken in connection with the accompanying drawing, the advantages of the construction and method of use will be readily understood by those skilled in the art to which this invention appertains. While I have described the features and principles of operation of a structure which I now consider to be a preferred embodiment of my invention, I desire to have it understood that the showing is primarily illustrative, and that such changes may be made, when desired, as fall within the scope of the following claims.

I claim:

1. In a fishing pole holder for the described purpose, a stake comprising a member of channel cross-section having an end thereof shaped for the driving of the stake into the ground for its fixed disposal in an upright position, and bifurcated at its other end to provide a fork having sides presenting corresponding edges in mutually coplanar relation and with their plane in oblique relation to the longitudinal axis of the stake whereby a pole disposed longitudinally in the trough of the stake will extend obliquely through the fork, a member providing a pole-receiving loop at the trough side of the stake and slidably mounted on the stake in frictional engagement therewith for its adjusted positioning along the stake, and a stop element provided on the stake below the member to limit the downward movement of the member along the stake whereby the application of pressure on the member engaging the stop may be operative to effect a driving of the stake into the ground.

2. In a fishing-pole holder for the described purpose, a stake for fixed disposal in an upright position and comprising a member of channel cross-section and bifurcated at its upper end to provide a fork having sides presenting corresponding edges in mutually coplanar relation and with their plane in oblique relation to the longitudinal axis of the stake whereby a pole disposed longitudinally in the trough of the stake will extend obliquely through the fork, and a member mounted on the stake for adjustment longitudinally therealong and providing a loop encircling the stake trough and arranged to freely receive the butt end of a fishing pole in the trough, said fork being adapted to engage a reel base carried by the pole.

RUDOLPH W. GOEB.